(12) United States Patent
Saxon et al.

(10) Patent No.: US 10,677,346 B2
(45) Date of Patent: Jun. 9, 2020

(54) HYDRAULIC CONTROL MODULE AND SOLENOID ASSEMBLY INCLUDED THEREIN

(71) Applicant: BorgWarner Inc., Auburn Hills, MI (US)

(72) Inventors: Howard Saxon, Clinton Township, MI (US); Aaron Wolfson, Troy, MI (US); Mitsuru Ishihara, Novi, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/520,972

(22) Filed: Jul. 24, 2019

(65) Prior Publication Data

US 2019/0346039 A1    Nov. 14, 2019

Related U.S. Application Data

(63) Continuation of application No. 15/677,616, filed on Aug. 15, 2017, now Pat. No. 10,408,339.

(51) Int. Cl.
| | | |
|---|---|---|
| *F16H 61/02* | (2006.01) | |
| *F16H 61/28* | (2006.01) | |
| *F16H 61/00* | (2006.01) | |

(52) U.S. Cl.
CPC ..... *F16H 61/0206* (2013.01); *F16H 61/0251* (2013.01); *F16H 61/0003* (2013.01);
(Continued)

(58) Field of Classification Search
CPC ............. F16H 61/0206; F16H 61/0251; F16H 61/0003; F16H 61/0009; F16H 61/2807; F16H 2061/0209; F16H 2061/0253
See application file for complete search history.

(56) References Cited

U.S. PATENT DOCUMENTS 5,289,844 A    3/1994   Stevenson
5,363,722 A *  11/1994  Klotz ................. F16H 61/0003
                                                    403/79
(Continued)

FOREIGN PATENT DOCUMENTS

DE          9300848 U1     5/1994
JP          H05164228 A    6/1993
(Continued)

OTHER PUBLICATIONS

English language abstract and machine-assisted English translation for DE 93 00 848 extracted from espacenet.com database on Jul. 16, 2018, 5 pages.

(Continued)

*Primary Examiner* — Stacey A Fluhart
(74) *Attorney, Agent, or Firm* — Howard & Howard Attorneys PLLC

(57) ABSTRACT

A solenoid assembly includes a solenoid adapted to be coupled to a solenoid connecting member, with the solenoid connecting member extending from a support member. The solenoid assembly also includes a retaining bracket having a body portion and a securing portion extending from the body portion. The body portion is adapted to be removably coupled to the solenoid connecting member, and the securing portion is removably coupled to the solenoid. The retaining bracket is moveable between an unsecured position, and a secured position. The securing portion of the retaining bracket provides a spring force to the solenoid when the retaining bracket is in the secured position such that the solenoid is biased toward the solenoid connecting member to secure the solenoid between the solenoid connecting member and the securing portion of the retaining bracket.

20 Claims, 11 Drawing Sheets

(52) U.S. Cl.
CPC ...... *F16H 61/0009* (2013.01); *F16H 61/2807* (2013.01); *F16H 2061/0209* (2013.01); *F16H 2061/0253* (2013.01)

(56) References Cited

U.S. PATENT DOCUMENTS

| | | | |
|---|---|---|---|
| 5,649,510 | A | 7/1997 | Linze |
| 6,085,615 | A | 7/2000 | Kirkendall |
| 6,230,585 | B1 * | 5/2001 | Bator ................. F16H 61/0009 137/343 |
| 6,305,664 | B1 * | 10/2001 | Holmes ................. F16K 31/06 251/129.18 |
| 6,530,856 | B1 | 3/2003 | Kakiage |
| 6,544,138 | B2 | 4/2003 | True et al. |
| 6,612,528 | B2 | 9/2003 | Collins et al. |
| 6,695,748 | B2 | 2/2004 | Kopec et al. |
| 7,127,961 | B2 | 10/2006 | Braford et al. |
| 7,798,174 | B2 | 9/2010 | Ford et al. |
| 2003/0226527 | A1 | 12/2003 | Herbert |
| 2012/0085436 | A1 * | 4/2012 | Jones ................. F16H 61/0251 137/485 |
| 2019/0056027 | A1 | 2/2019 | Saxon et al. |
| 2019/0178370 | A1 * | 6/2019 | Dick ................. F16K 11/07 |

FOREIGN PATENT DOCUMENTS

| | | |
|---|---|---|
| JP | H05164229 A | 6/1993 |
| JP | H0722113 | 4/1995 |
| WO | 2010144312 A2 | 12/2010 |

OTHER PUBLICATIONS

English language abstract and machine-assisted English translation for JPH 05-164228 extracted from translatoruser.net on Jul. 16, 2018, 10 pages.

English language abstract and machine-assisted English translation for JPH 05-164229 extracted from translatoruser.net on Jul. 16, 2018, 11 pages.

English language abstract and machine-assisted English translation for JPH 07-22113 extracted from espacenet.com database on May 6, 2019, 17 pages.

International Search Report for Application No. PCT/US2018/044942 dated Apr. 22, 2019, 4 pages.

* cited by examiner

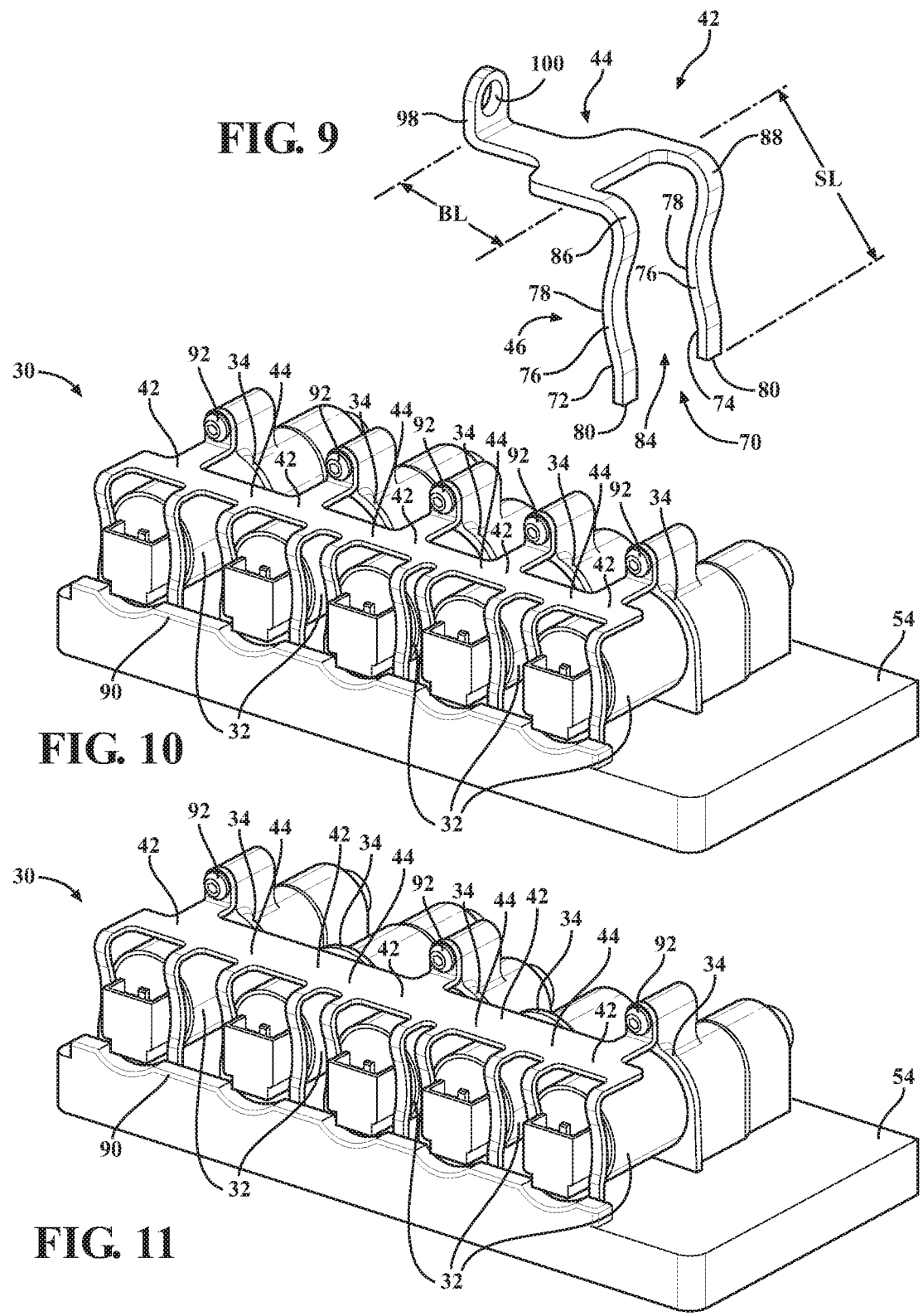

HYDRAULIC CONTROL MODULE AND SOLENOID ASSEMBLY INCLUDED THEREIN

CROSS-REFERENCE TO RELATED APPLICATIONS

The subject patent application is a continuation of co-pending U.S. Nonprovisional patent application Ser. No. 15/677,616 filed on Aug. 15, 2017, which is herein incorporated by reference in its entirety.

BACKGROUND OF THE INVENTION

1. Field of the Invention

The subject invention generally relates to a solenoid assembly for a hydraulic control module for use in a transmission of a motor vehicle.

2. Description of the Related Art

Conventional vehicle powertrain systems known in the art typically include an engine in rotational communication with a transmission. The engine generates rotational torque which is selectively translated to the transmission which, in turn, translates rotational torque to one or more wheels. Typical transmissions are shifted in discrete steps between a high-torque, low-speed mode for starting a vehicle and a high-speed, low-torque mode for vehicle operation at highway speeds. In a manual transmission, shifting is accomplished by the manual controlled engagement of gear sets. In an automatic transmission, shifting is accomplished by the automatic controlled engagement of friction elements.

To control shifting in the automatic transmission, a hydraulic control module includes a valve body coupled to a transmission housing of the automatic transmission, with the valve body defining a hydraulic circuit. Hydraulic fluid flowing within the hydraulic circuit facilitates shifting and controlled engagement of the friction elements.

To facilitate shifting and controlled engagement of the friction elements of the automatic transmission, the hydraulic control assembly typically includes a pump to provide pressurized hydraulic fluid, and a plurality of valves for controlling the flow of hydraulic fluid through the hydraulic circuit. In recent years, such automatic transmissions have used various electronic elements, such as solenoids, to control the plurality of valves for controlling the flow of hydraulic fluid through the hydraulic circuit. To couple the solenoids to the valve body, the hydraulic control module additionally includes brackets for coupling the solenoids to the valve body. Traditional brackets are specifically designed for certain automatic transmissions and valve bodies based on dimensional and spacing considerations.

However, traditional brackets do not account for tolerances of multiple components of the hydraulic control module, which causes the traditional brackets to inadequately secure the solenoid and causes traditional brackets to, at times, not fasten correctly to the valve body. Traditional brackets also must be designed to account for dimensional stack up of various components of the hydraulic control module, which increases design costs and increases manufacturing time. Also, a clamp load from the tightening of fasteners to fasten the traditional bracket against the solenoid is inadequately controlled, because the clamp load is often too strong, which can damage the solenoid, or is too weak, which allows movement of the solenoid with respect to the valve body, both of which are undesirable. Depending on where the solenoid is clamped by the traditional bracket, traditional valve bodies need to provide mounting tower projections, which increases cost and casting concerns for the valve body. As an alternative to mounting tower projections, traditional valve bodies may use tubular spacers, shims, and/or flat brackets to account for different tolerances, all of which increase costs, therefore making it more difficult to mass-produce traditional brackets and valve bodies. As such, there remains a need for an improved bracket for hydraulic control modules.

SUMMARY OF THE INVENTION AND ADVANTAGES

A solenoid assembly includes a solenoid adapted to be coupled to a solenoid connecting member, with the solenoid connecting member extending from a support member. The solenoid assembly also includes a retaining bracket having a body portion and a securing portion extending from the body portion. The body portion is adapted to be removably coupled to the solenoid connecting member, and the securing portion is removably coupled to the solenoid. The retaining bracket is moveable between an unsecured position where the retaining bracket is uncoupled from the solenoid connecting member and the solenoid, and a secured position where the body portion of the retaining bracket is coupled to the solenoid connecting member and the securing portion of the retaining bracket is coupled to the solenoid such that the solenoid is secured to the support member. The securing portion of the retaining bracket provides a spring force to the solenoid when the retaining bracket is in the secured position such that the solenoid is biased toward the solenoid connecting member to secure the solenoid between the solenoid connecting member and the securing portion of the retaining bracket.

Accordingly, the retaining bracket is able to account for tolerances of multiple components of the hydraulic control module, which allows the retaining bracket to adequately secure the solenoid. Additionally, dimensional stack up of various components is decreased, which decreases design costs and manufacturing time of the solenoid assembly. Also, a clamp load of the retaining bracket from various fasteners does not need to be controlled due to the spring force provided by the securing portion of the retaining bracket, which avoids concerns of the clamp load from being too strong or too weak. Additionally, mounting tower projections are not needed to couple the solenoid to the valve body, which reduces costs, as a result of the body portion of the retaining bracket being adapted to be removably coupled to the solenoid connecting member, and the securing portion being removably coupled to the solenoid, which then allows the securing portion of the retaining bracket to provide the spring force to the solenoid when the retaining bracket is in the secured position. Furthermore, additional tubular spacers, shims, and/or flat brackets are not needed to secure the solenoid between the solenoid connecting member and the securing portion of the retaining bracket to account for tolerances, which also reduces costs.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 9 is a perspective view of the retaining bracket;

FIG. 10 is a perspective view of the hydraulic control module including a plurality of the solenoid connecting members, and with the solenoid assembly including a plurality of the retaining brackets and a plurality of the solenoids, with the plurality of retaining brackets being integral with one another at the body portion of each of the retaining brackets;

FIG. 11 is a perspective view of the hydraulic control module including a plurality of the solenoid connecting members, and with the solenoid assembly including a plurality of the retaining brackets and a plurality of the solenoids, with the plurality of retaining brackets being integral with one another at the body portion of each of the retaining brackets, and with the solenoid assembly using fewer fasteners than the solenoid assembly of FIG. 10;

DETAILED DESCRIPTION OF THE INVENTION

Figure 1:
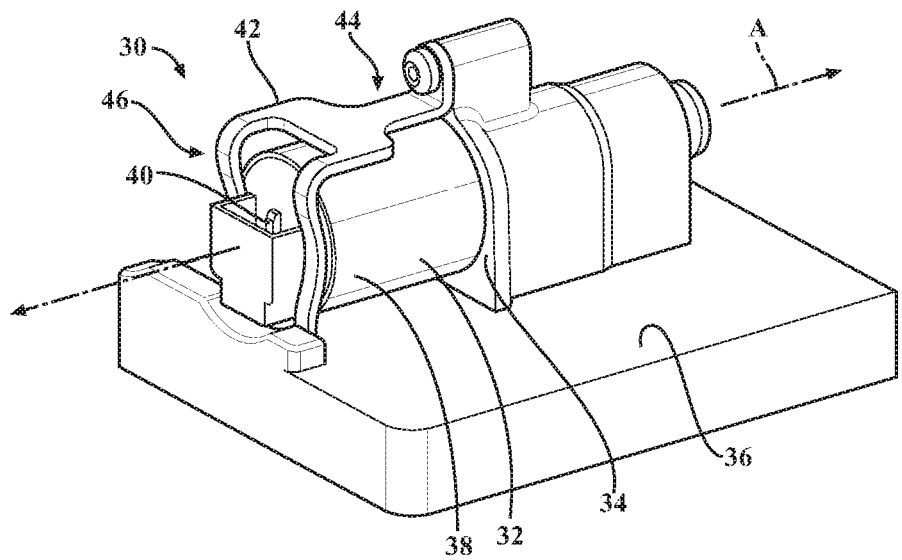
FIG. 1 is a perspective view of a solenoid assembly including solenoid adapted to be coupled to a solenoid connecting member, with the solenoid connecting member extending from a support member, and a retaining bracket having a body portion and a securing portion extending from the body portion.
Figure 2:
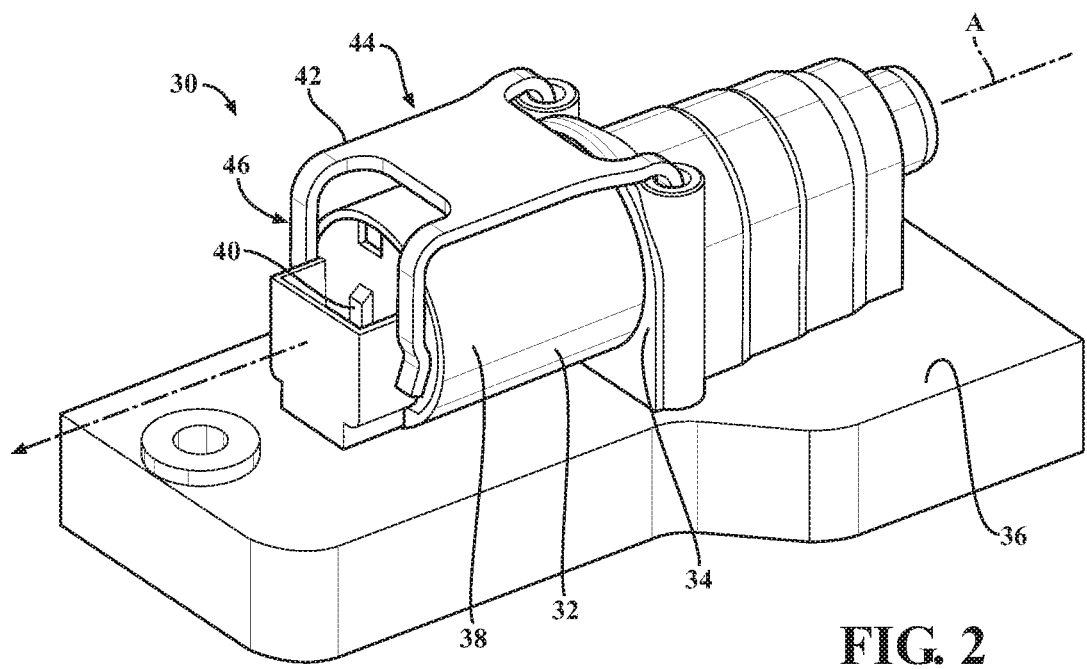
FIG. 2 is a perspective view of another embodiment of the retaining bracket.

With reference to the Figures, wherein like numerals indicate like parts throughout the several views, a solenoid assembly 30 is generally shown in FIGS. 1 and 2. The solenoid assembly 30 includes a solenoid 32 adapted to be coupled to a solenoid connecting member 34, with the solenoid connecting member 34 extending from a support member 36. The solenoid 32 may include an outer casing 38, with the outer casing 38 typically being comprised of metal. The solenoid 32 may also include a terminal 40. The solenoid 32 extends along a longitudinal axis A.

Figure 5:
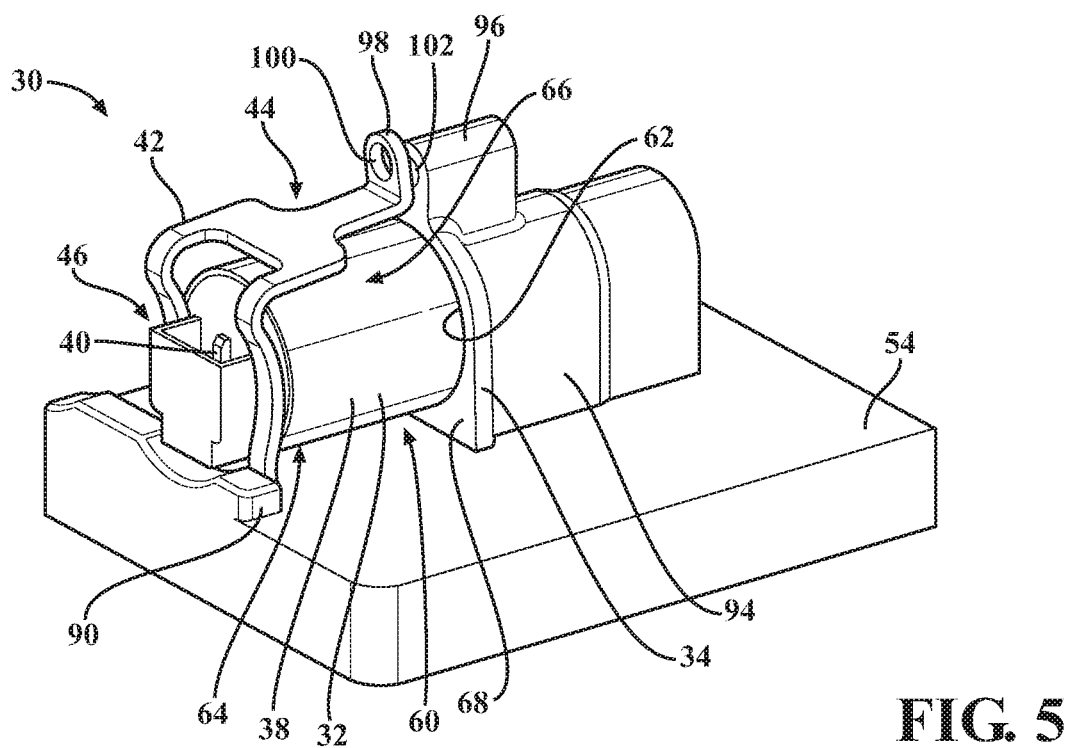
FIG. 5 is a perspective view of the retaining bracket in an unsecured position.
Figure 6:
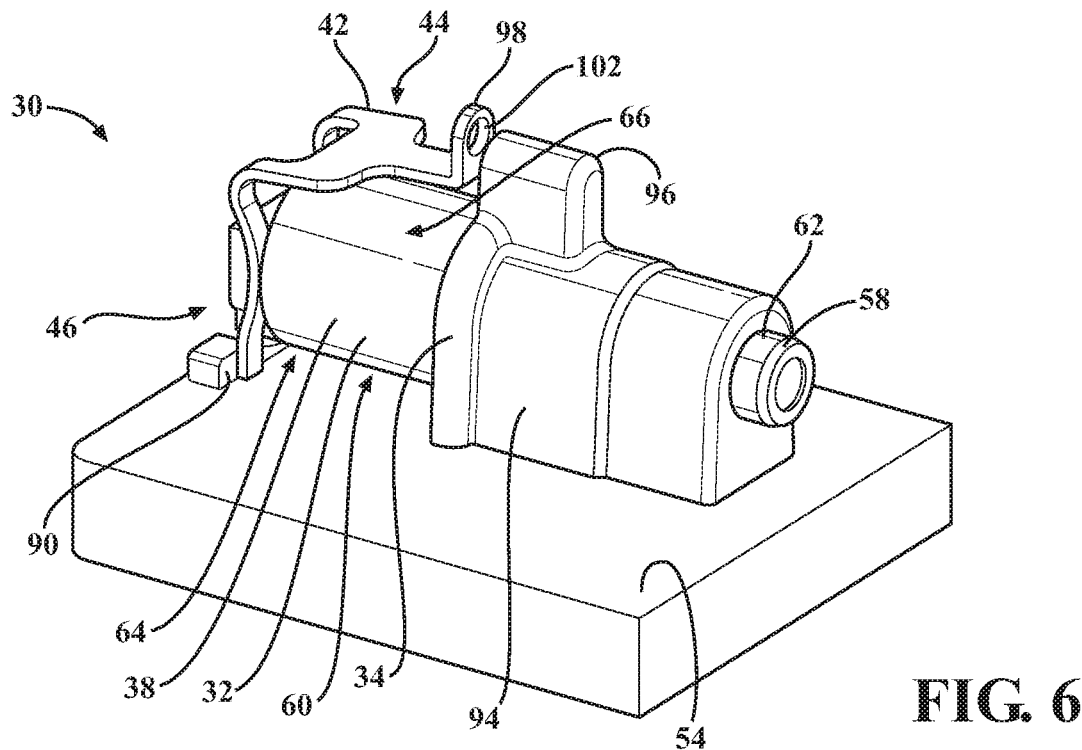
FIG. 6 is a perspective view of the retaining bracket in the unsecured position, with the valve body including a secured retaining feature adjacent the solenoid, and with the securing portion of the retaining bracket engaged with the secured retaining feature such that the secured retaining feature acts as a fulcrum for the securing portion when the retaining bracket is in the secured position.
Figure 7:
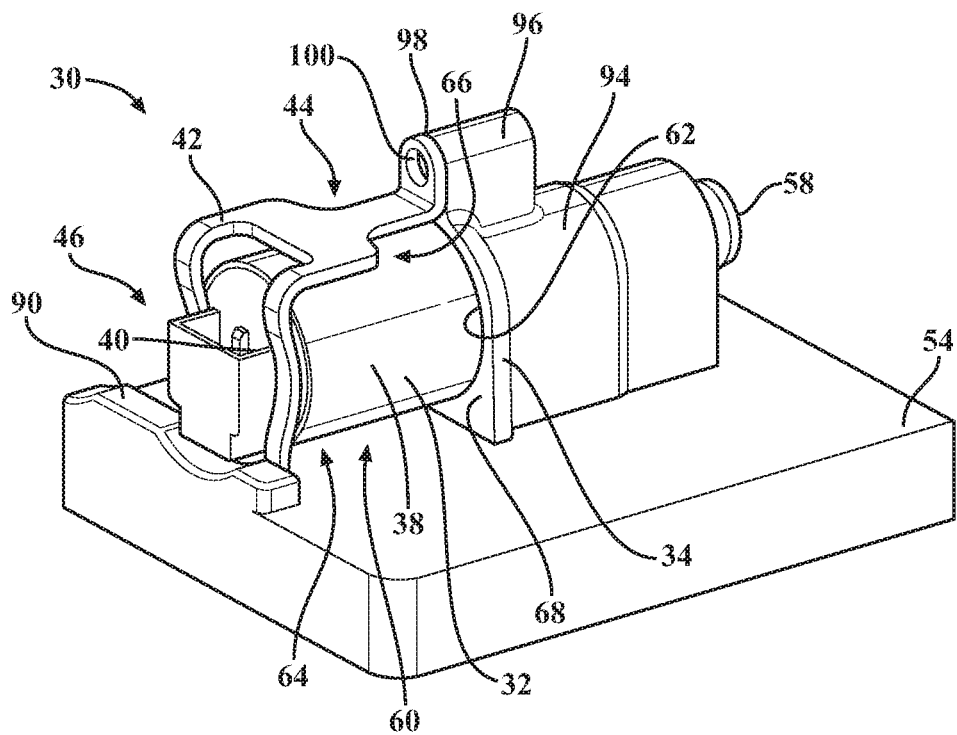
FIG. 7 is a perspective view of the retaining bracket in a secured position.

The solenoid assembly 30 also includes a retaining bracket 42 having a body portion 44 and a securing portion 46 extending from the body portion 44. Typically, the securing portion 46 extends substantially perpendicular from the body portion 44. The body portion 44 is adapted to be removably coupled to the solenoid connecting member 34, and the securing portion 46 is removably coupled to the solenoid 32. The retaining bracket 42 is moveable between an unsecured position, as shown in FIGS. 5-7, and a secured position, as shown in FIGS. 1, 2, 8, and 10-20. When in the retaining bracket 42 is in the unsecured position, the retaining bracket 42 is uncoupled from the solenoid connecting member 34. When the retaining bracket 42 is in the secured position, the body portion 44 of the retaining bracket 42 is coupled to the solenoid connecting member 34 and the securing portion 46 of the retaining bracket 42 is coupled to the solenoid 32 such that the solenoid 32 is secured to the support member 36. The securing portion 46 of the retaining bracket 42 provides a spring force to the solenoid 32 when the retaining bracket 42 is in the secured position such that the solenoid 32 is biased toward the solenoid connecting member 34 to secure the solenoid 32 between the solenoid connecting member 34 and the securing portion 46 of the retaining bracket 42.

Figure 3:
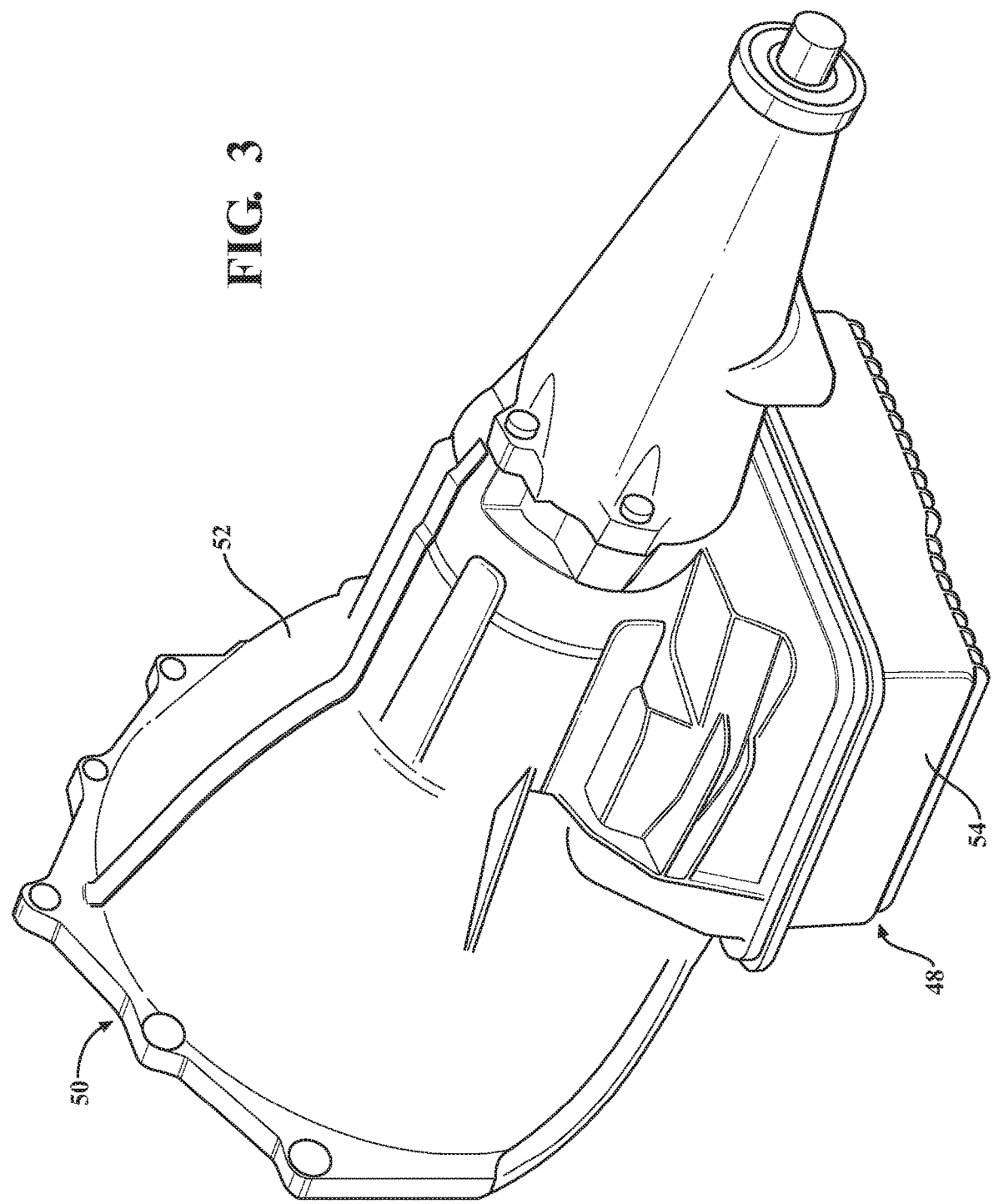
FIG. 3 is a perspective view of a transmission including a transmission housing, with a valve body of a hydraulic control module coupled to the transmission housing.
Figure 4:
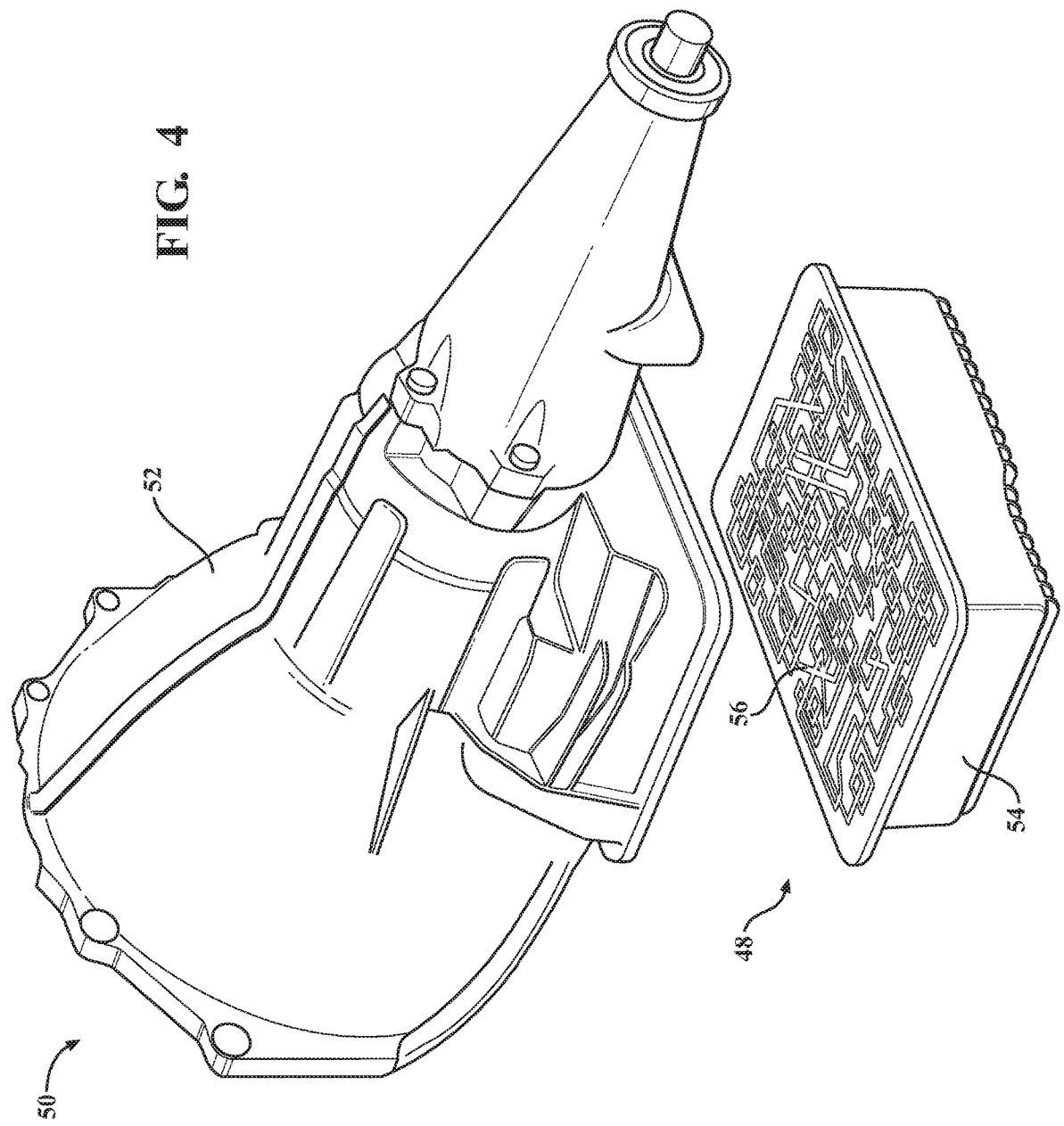
FIG. 4 is a perspective view of the valve body of the hydraulic control module defining a hydraulic circuit.

As shown in FIGS. 3 and 4, the solenoid assembly 30 may be used in a hydraulic control module 48 for use with a transmission 50 of a motor vehicle. The transmission 50 includes a transmission housing 52. The hydraulic control module 48 includes a valve body 54, with the valve body 54 being adapted to be coupled to the transmission housing 52. The valve body 54 defines a hydraulic circuit 56. The hydraulic circuit 56 directs flow of hydraulic fluid within the hydraulic circuit 56, which facilitates shifting of the transmission 50. It is to be appreciated that in some embodiments the solenoid 32 may be within the interior of the valve body 54, and in other embodiments the solenoid 32 may be on the exterior of the valve body 54.

It is to be appreciated that any description of the solenoid assembly 30, namely the retaining bracket 42 and the solenoid 32, in the hydraulic control module 48 including the valve body 54 also applies to embodiments with the support member 36. Likewise, any description of the solenoid assembly 30, namely the retaining bracket 42 and the solenoid 32, with the support member 36 also applies to embodiments of the hydraulic control module 48 with the valve body 54. The support member 32 may refer to any structure to which the solenoid 32 is secured, such as a motor, a housing of a parking mechanism, another solenoid, a stand-alone structure, an actuator, valve train assembly, an engine block, a transmission housing, or a solenoid body of a hydraulic control module.

When the solenoid assembly 30 is used in the hydraulic control module 48, the solenoid connecting member 34 extends from the valve body 54. Typically, the solenoid connecting member 34 integrally extends from the valve body 54. In other words, the solenoid connecting member 34 and the valve body 54 are one piece. Typically, when the solenoid connecting member 34 integrally extends from the valve body 54, the solenoid connecting member 34 is machined with the valve body 54. It is to be appreciated that the solenoid connecting member 34 may also be fastened, welded, or cast to the valve body 54.

The retaining bracket 42 is able to account for tolerances of multiple components of the hydraulic control module 48 as a result of the securing portion 46 providing the spring force, which allows the retaining bracket 42 to adequately secure the solenoid 32. The spring force provided by the securing portion 46 of the retaining bracket 42 helps to account for differences in size due to tolerances between various components of the valve body 54, which reduces dimensional stack up. Also, a clamp load of the retaining bracket 42 from various fasteners does not need to be controlled due to the spring force provided by the securing portion 46 of the retaining bracket, which avoids concerns of the clamp load from being too strong, which may damage the solenoid 32, or too weak, which may allow too much movement of the solenoid 32. For example, in some embodiments, as described in further detail below, the solenoid assembly 30 may have one fastener or may have no fasteners. Additionally, other typical components of typical valve bodies, such as mounting tower projections, are not needed to couple the solenoid 32 to the valve body 54, which reduces costs, and also decreases manufacturing time as fewer components are needed to secure the solenoid 32 to the valve body 54. This reduction in cost is, in part, a result of the body portion 44 of the retaining bracket 42 being adapted to be removably coupled to the solenoid connecting member 34, and the securing portion 46 being removably coupled to the solenoid 32, which then allows the securing portion 46 of the retaining bracket 42 to provide the spring force to the solenoid 32 when the retaining bracket 42 is in the secured position. Furthermore, the retaining bracket 42 eliminates the need of adding tubular spacers, shims, and/or flat brackets to account for different tolerances to secure the solenoid 32 between the solenoid connecting member 34 and the securing portion 46 of the retaining bracket 42, which also reduces costs. Also, the securing portion 46 of the retaining bracket 42 allows control of the spring force, which may prevent the solenoid 32 from moving when the retaining bracket 42 is in the secured position. The spring force may be adjusted, as described in further detail below.

Figure 13:
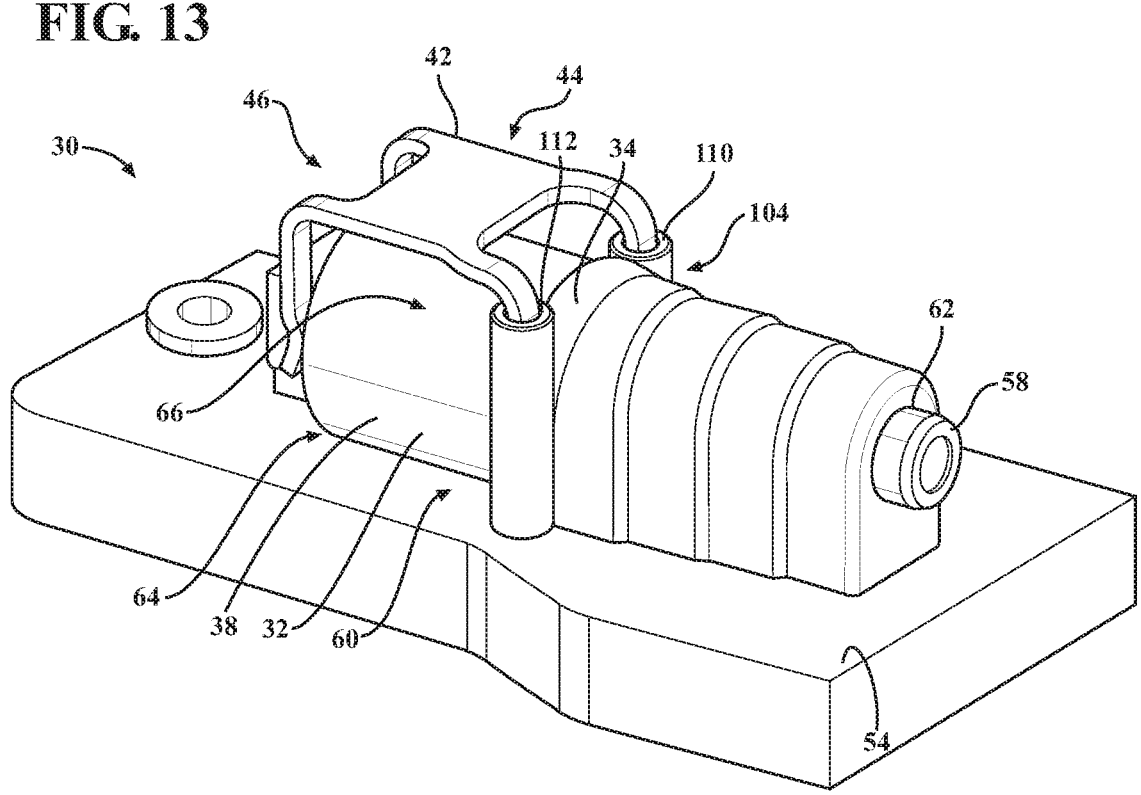
FIG. 13 is a perspective view of the retaining bracket of FIG. 12, with the retaining bracket having a fixing portion extending from the body portion, with the fixing portion being further defined as a first fixing arm and a second fixing arm, with solenoid connecting member defining a first fixing channel and a second fixing channel, and with the first fixing arm being disposed in the first fixing channel and the second fixing arm being disposed in the second fixing channel to couple the retaining bracket to the valve body.
Figure 15:
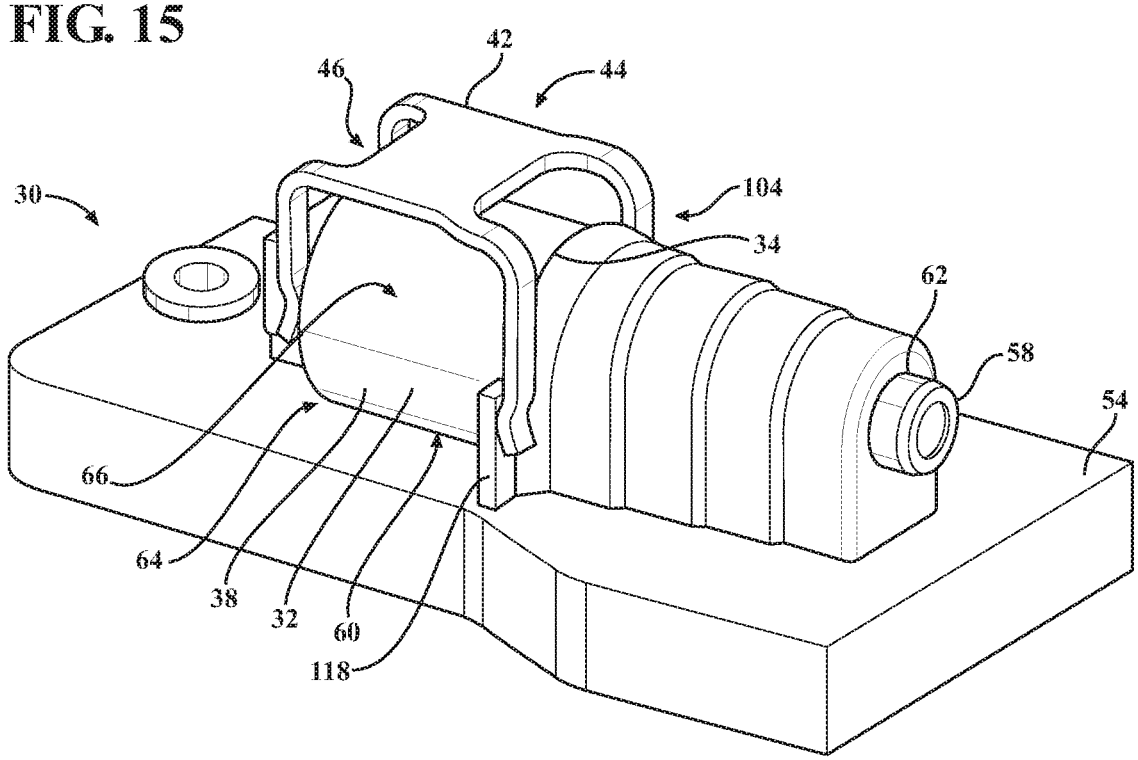
FIG. 15 is a perspective view of the retaining bracket of FIG. 12, with the valve body including the fixed retaining feature adjacent the solenoid connecting member, and with the fixing portion of the retaining bracket engaged with the fixed retaining feature.

The hydraulic control module 48 may include a valve 58, as best shown in FIGS. 6, 13, and 15, coupled to the valve body 54 to control hydraulic fluid within the hydraulic circuit 56. Typically, actuation of the solenoid 32 controls the valve 58, which, in turn, controls hydraulic fluid within the hydraulic circuit. Control of the hydraulic fluid within the hydraulic circuit 56 may include controlling flow and/or pressure of the hydraulic fluid. The valve 58 may be located anywhere on the valve body 54 to control hydraulic fluid within the hydraulic circuit 56. In some embodiments, the solenoid 32 may be a linear solenoid or rotary solenoid. In other embodiments, the solenoid 32 is further defined as a hydraulic solenoid valve. In this embodiment, the hydraulic solenoid valve includes the valve 58 and a solenoid portion 60. The valve 58 typically extends from the solenoid portion 60 along longitudinal axis A. The solenoid connecting member 34 may define a bore 62. When the solenoid connecting member 34 defines the bore 62, the valve 58 of the hydraulic solenoid valve may be received within the bore 62 of the solenoid connecting member 34. Additionally, when the valve 58 of the hydraulic solenoid valve is received within the bore 62 of the solenoid connecting member 34, the solenoid portion 60 of the hydraulic solenoid valve 58 may be coupled to the securing portion 46 of the retaining bracket 42 when the retaining bracket 42 is in the secured position. It is to be appreciated that in some embodiments the solenoid portion 60 may be within an interior of the transmission housing 52, and in other embodiments the solenoid portion may be on the exterior of the transmission housing 52.

The solenoid 32 may have a bottom solenoid portion 64 and a top solenoid portion 66, with the bottom solenoid portion 64 being disposed between the valve body 54 and the top solenoid portion 66. Typically, the securing portion 46 of the retaining bracket 42 is coupled to the top solenoid portion 66 when the retaining bracket 42 is in the secured position. Coupling the securing portion 46 of the retaining bracket 42 to the top solenoid portion 66 eliminates the need for mounting tower projections and/or tubular spacers. Typically, the securing portion 46 of the retaining bracket 42 is coupled to the outer casing 38 at the top solenoid portion 66.

Typically, the securing portion 46 and the body portion 44 straddle the solenoid 32 when the retaining bracket 42 is in the secured position. In some embodiments, the solenoid 32 is disposed between the body portion 44 and the valve body 54. Having the securing portion 46 and the body portion 44 straddling the solenoid 32 when the retaining bracket 42 is in the secured position allows a closer nesting of multiple solenoids, as described in further detail below.

Figure 8:
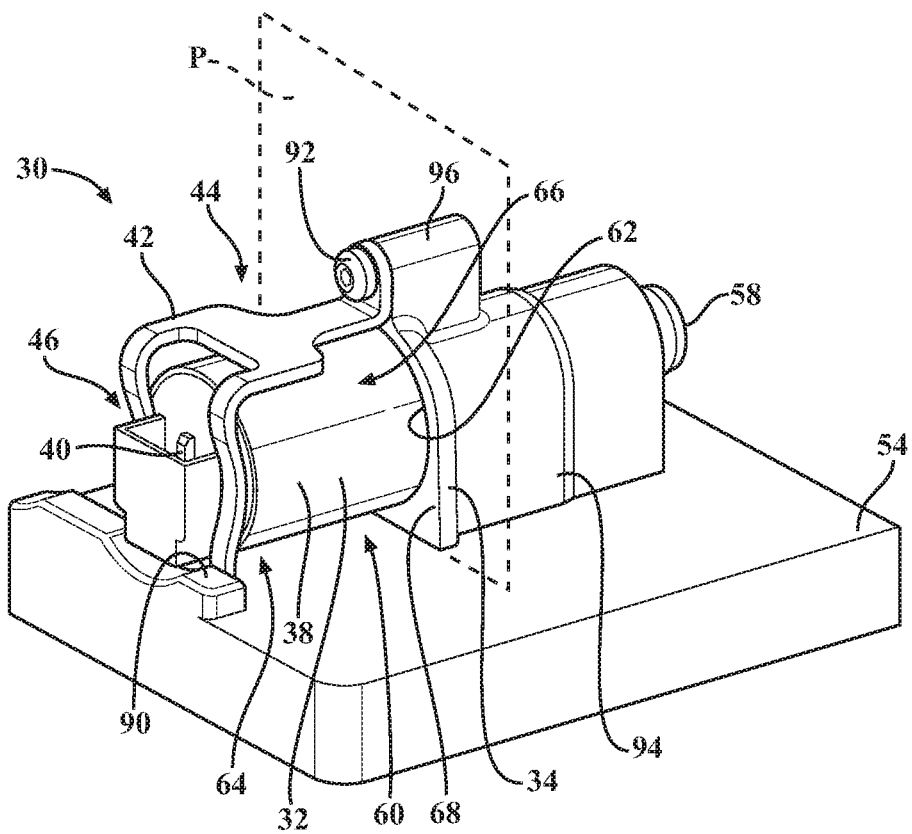
FIG. 8 is a perspective view of the solenoid assembly including a fastener, with the solenoid connecting member presenting an outer surface, with the solenoid connecting member having a projection extending from the outer surface, and with the fastener coupling the body portion of the retaining bracket to the projection to secure the retaining bracket in the secured position.

The solenoid connecting member 34 may include a mounting surface 68. Typically, the mounting surface 68 is perpendicular to the longitudinal axis A, with the mounting surface 68 facing, when present, the solenoid portion 60. The mounting surface 68 defines a datum plane P, as shown in FIG. 8. In one embodiment, the solenoid portion 60 engages the mounting surface 68 and the body portion 44 of the retaining bracket 42 engages the mounting surface 68 when the retaining bracket 42 is in the secured position. Having the solenoid portion 60 engaging the mounting surface 68 and the body portion 44 of the retaining bracket 42 when the retaining bracket 42 is in the secured position allows the body portion 44 and the solenoid to both be on the datum plane P, which reduces any dimensional stack up from multiple components of the hydraulic control module 48.

Figure 16:
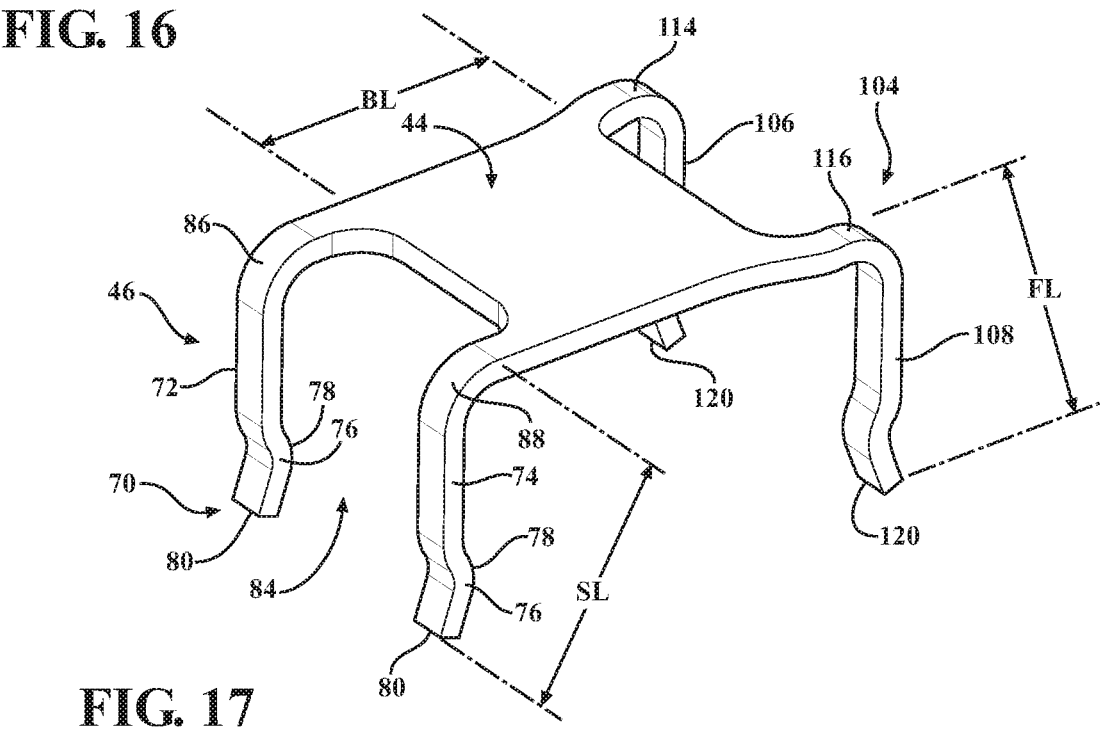
FIG. 16 is a perspective view of the retaining bracket of FIG. 12.
Figure 17:
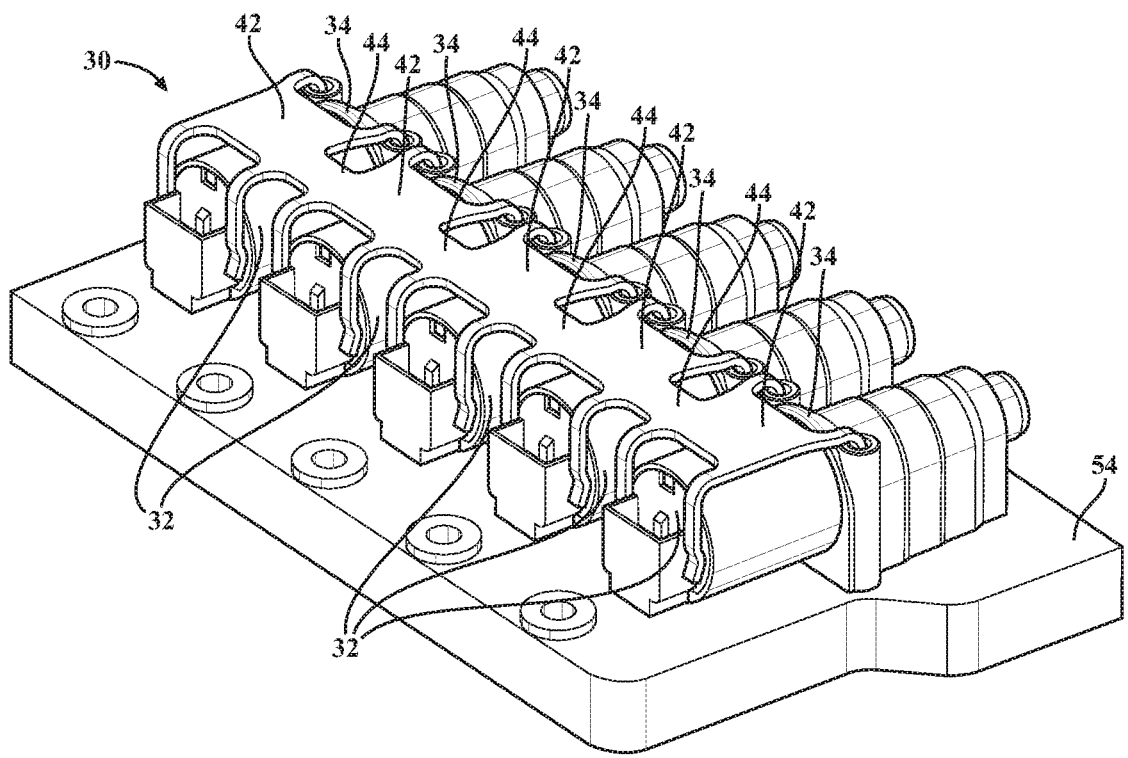
FIG. 17 is a perspective view of the hydraulic control module including a plurality of the solenoid connecting members, and with the solenoid assembly including a plurality of the retaining brackets of FIG. 12 and a plurality of the solenoids, with the plurality of retaining brackets being integral with one another at the body portion of each of the retaining brackets.
Figure 18:
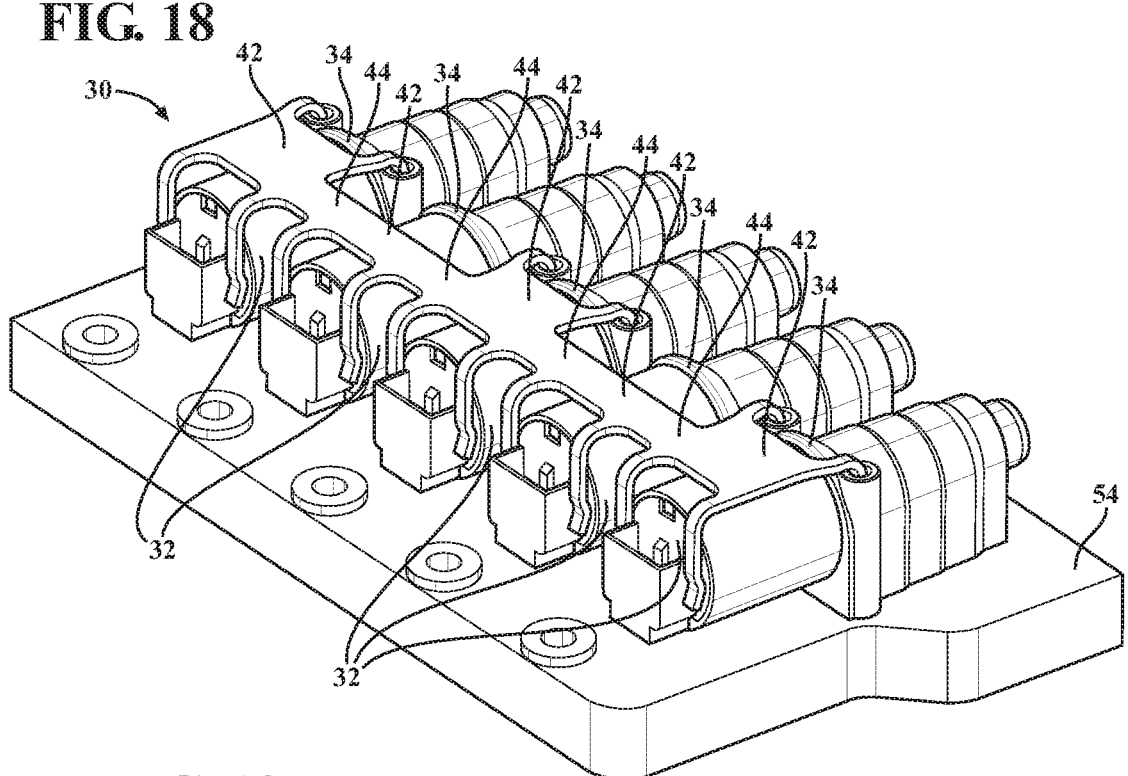
FIG. 18 a perspective view of the hydraulic control module including the plurality of the solenoid connecting members, and with the solenoid assembly including the plurality of the retaining brackets of FIG. 12 and the plurality of the solenoids, with the plurality of retaining brackets being integral with one another at the body portion of each of the retaining brackets, and with the solenoid connecting members defining fewer fixing channels than the solenoid connecting members of FIG. 17.
Figure 19:
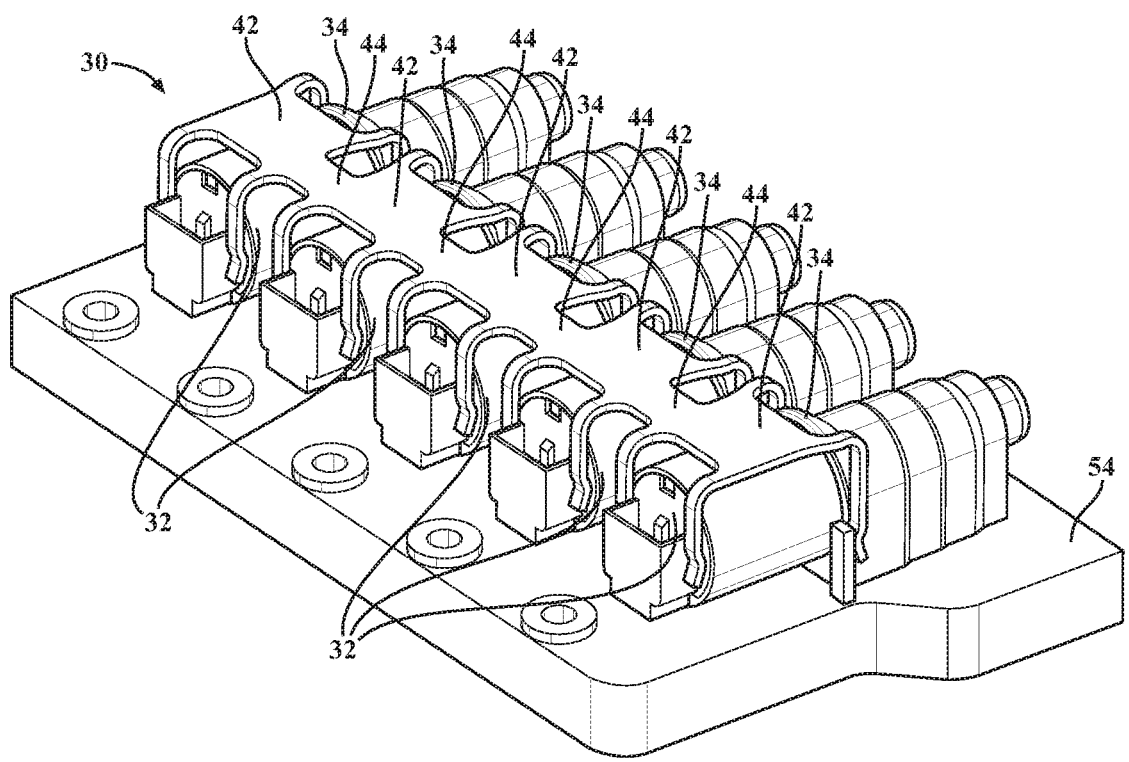
FIG. 19 a perspective view of the hydraulic control module including the plurality of the solenoid connecting members, and with the solenoid assembly including a plurality of the retaining brackets of FIG. 12 and a plurality of the solenoids, with the plurality of retaining brackets being integral with one another at the body portion of each of the retaining brackets, and with the valve body including the fixed retaining feature adjacent the solenoid connecting member.
Figure 20:
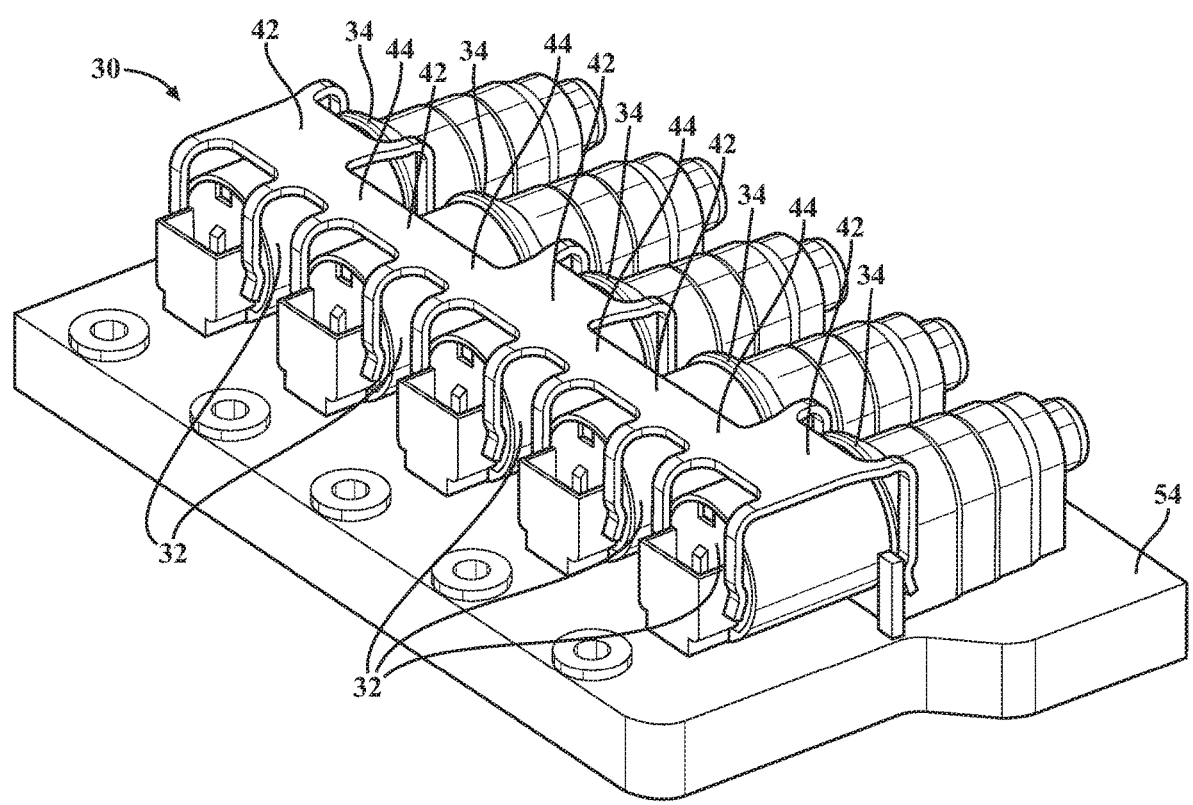
FIG. 20 a perspective view of the hydraulic control module including the plurality of the solenoid connecting members, and with the solenoid assembly including a plurality of the retaining brackets of FIG. 12 and a plurality of the solenoids, with the plurality of retaining brackets being integral with one another at the body portion of each of the retaining brackets, and with the valve body including fewer fixed retaining features than the valve body of FIG. 19.

As best shown in FIGS. 9 and 16, the securing portion 46 of the retaining bracket 42 may have a free end 70 that is unattached from the valve body 54 when in either of the secured and unsecured positions, and the body portion 44 of the retaining bracket 42 may be fixed to the solenoid connecting member 34 when the retaining bracket 42 is in the secured position. The free end 70 of the securing portion 46 may be coupled to the top solenoid portion 66 when the retaining bracket 42 is in the secured position. The free end 70 of the securing portion 46 of the retaining bracket 42 allows for an easier installation of the retaining bracket 42 to couple the solenoid 32 to the valve body 54. For example, the free end 70 of the securing portion 46 being unattached from the valve body 54 when in either of the secured and unsecured positions allows the free end 70 to be coupled to the solenoid 32, and the body portion 44 of the retaining bracket 42 coupled to the solenoid connecting member 34. In other words, only one portion, here the body portion 44, of the retaining bracket 42 is required to be fixed to the solenoid connecting member 34, which, in turn, fixes the retaining bracket 42 to the valve body 54. When the body portion 44 of the retaining bracket 42 is fixed to the solenoid connecting member 34 and the securing portion 46 is coupled to the solenoid 32, the solenoid 32 is secured between the solenoid connecting member 34 and the securing portion 46 of the retaining bracket 42, with the securing portion 46 providing the spring force to the solenoid 32. Depending on the strength of the spring force, the solenoid 32 may be fixedly secured with respect to the valve body 54 such that the solenoid 32 does not move when the retaining bracket 42 is in the secured position. As described in further detail below, the spring force provided by the securing portion 46 of the retaining bracket 42 may be adjusted.

With continued reference to FIGS. 9 and 16, the securing portion 46 of the retaining bracket 42 is further defined as a first securing leg 72 and a second securing leg 74. The first and second securing legs 72, 74 provide the spring force to the solenoid 32 such that the solenoid 32 is biased toward the solenoid connecting member 34 when the retaining bracket 42 is in the secured position. In this embodiment, the first and second securing legs 72, 74 may each have a curved portion 76, with each curved portion 76 presenting a contact surface 78 to contact and provide the spring force to the solenoid 32 such that the solenoid 32 is biased toward the solenoid connecting member 34 when the retaining bracket 42 is in the secured position. The contact surface 78 may contact the top solenoid portion 66 of the solenoid 32. As described in further detail below, contacting the top solenoid portion 66 allows for a closer nesting when multiple solenoids are adjacent in the valve body 54.

Depending on the spring force required to bias the solenoid 32 toward the solenoid connecting member 34 when the retaining bracket 42 is in the secured position, the curved portion 76 may be adjusted. For example, the curve of the curved portion 76 may be increased with respect to the body portion 44, i.e., a greater curve, which may increase the spring force, or the curve of the curved portion 76 may be decreased, i.e., a smaller curve, which may decrease the spring force. Additionally, the curve of the curved portion 76 may be adjusted to also account for a greater tolerance for securing the solenoid 32. For example, the greater the curve of the curved portion 76, a greater tolerance for securing the solenoid 32 may be provided. Additionally, to adjust the spring force, the thickness of the retaining bracket 42 may be increased to provide a stronger spring force, or may be decreased to provide a smaller spring force. As best shown in FIGS. 5-9, each curved portion 76 may be configured as a leaf spring. When each curved portion 76 is configured as a leaf spring, the curved portion 76 is compressed against the solenoid 32 such that the securing portion 46 of the retaining bracket 42 provides the spring force to the solenoid 32 when the retaining bracket 42 is in the secured position.

The first and second securing legs 72, 74 may have a distal securing end 80 spaced from the body portion 44, with each of the first and second securing legs 72, 74 defining a securing length SL from the distal securing end 80 to the body portion 44 of the retaining bracket 42. The securing length SL of the first and second securing legs 72, 74 may be adjusted to accommodate different solenoid sizes, such as height, length, and/or width of the solenoid 32. Similarly, the body portion 44 may have a body length 82. The body length 82 may be adjusted to accommodate different solenoid sizes, such as height, length, and/or width of the solenoid 32. Typically, the first and second securing legs 72, 74 straddle the solenoid 32.

The first and second securing legs 72, 74 may define a gap 84 between one another. The gap 84 defined by the first and second securing legs 72, 74 allows easy access to the terminal 40 and other various components of the solenoid 32 when the retaining bracket 42 is in the secured position. Allowing access to the terminal 40 and, if present, a connector or lead frame, when the retaining bracket 42 is in the secured position allows the terminal 40 to be accessible without removing the retaining bracket 42 from the secured position.

When present, the first securing leg 72 and the body portion 44 may be joined together by a first securing bend 86, and the second securing leg 74 and the body portion 44 may be joined together by a second securing bend 88. The first and second securing bends 86, 88 provide the spring force from the first and second securing legs 72, 74 to the solenoid 32 when the retaining bracket 42 is in the secured position. The spring force provided from the first and second securing legs 72, 74 may be adjusted. For example, the first and second securing bends 86, 88 may be increased with respect to the body portion, i.e., a greater curve, which may increase the spring force, or the first and second securing bends 86, 88 may be decreased with respect to the body portion, i.e., a smaller curve, which may decrease the spring force. For an additional example, the curve of the curved portion 76 may also be adjusted to adjust the spring force provided by the first and second securing legs 72, 74. Additionally, the first and second securing bends 86, 88 may be adjusted to also account for a greater tolerance for securing the solenoid 32. Additionally, to adjust the spring force, the thickness of the retaining bracket 42 may be increased to provide a stronger spring force, or may be decreased to provide a smaller spring force. It is to be appreciated that multiple features of the retaining bracket 42, such as the first and second securing bends 86, 88 and the curved portion 76, may provide the spring force.

As shown in FIGS. 5-8, the valve body 54 may include a secured retaining feature 90 adjacent the solenoid 32. In this embodiment, the securing portion 46 of the retaining bracket 42 is engageable with the secured retaining feature 90 such that the secured retaining feature 90 acts as a fulcrum for the securing portion 46 when the retaining bracket 42 is in the secured position. When the secured retaining feature 90 acts as a fulcrum, the securing portion 46 may act as a lever. Typically, the secured retaining feature 90 is integral with the valve body, i.e., one piece. However, it is to be appreciated that the secured retaining feature 90 may be fastened, welded, cast, machined, or defined with the valve body 54. It is also to be appreciated that the secured retaining feature 90 may extend further from the valve body 54 than shown in FIGS. 5-8, or the secured retaining feature 90 may extend less from the valve body 54 than shown in FIGS. 5-8.

To couple the body portion 44 of the retaining bracket 42 to the solenoid connecting member 34, the solenoid assembly 30 may include a fastener 92. In such embodiments, the solenoid connecting member 34 presents an outer surface 94, with the solenoid connecting member 34 having a projection 96 extending from the outer surface 94. The fastener 92 couples the body portion 44 of the retaining bracket 42 to the projection 96 to secure the retaining bracket 42 in the secured position. The retaining bracket 42 may also have a flange 98 extending from the body portion 44 and away from the solenoid 32, with the flange 98 defining a hole 100. The projection 96 of the solenoid connecting member 34 may define a projection bore 102, with the fastener 92 being disposable through the hole 100 and the projection bore 102 to secure the retaining bracket 42 in the secured position. Typically, the flange 98 extends away from the solenoid 32. Having the securing portion 46 of the retaining bracket 42 providing the spring force to the solenoid 32 when the retaining bracket 42 is in the secured position such that the solenoid 32 is biased toward the solenoid connecting member 34 to secure the solenoid 32 may allow the hydraulic control module 48 to be free of spacers between the fastener 92 and the solenoid connecting member 34. In some embodiments, the fastener 92 is a threaded fastener.

With reference to FIGS. 12-16, the retaining bracket 42 may have a fixing portion 104 extending from the body portion 44, with the fixing portion 104 being removably coupled to the solenoid connecting member 34. The fixing portion 104 and the securing portion 46 each may provide the spring force for securing the solenoid 32 in the form of a compression force when the retaining bracket 42 is in the secured position. Although not explicitly shown in the Figures for the embodiment of the retaining bracket 42 in FIGS. 12-16, the unsecured position of the retaining bracket 42 is where the retaining bracket 42 is uncoupled from the solenoid connecting member 34 and the solenoid 32. As described in further detail below, the spring force may be adjusted such that the solenoid 32 does not move.

Figure 12:
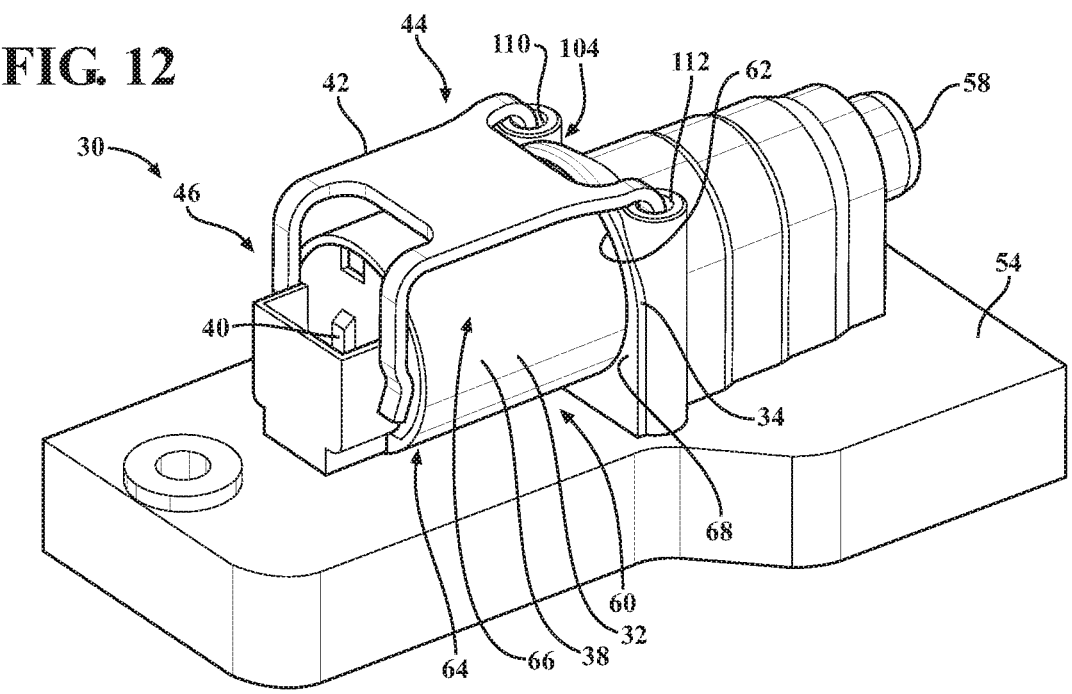
FIG. 12 is a perspective view of another embodiment of the retaining bracket, with the retaining bracket being in the secured position.

In some embodiments, the fixing portion 104 of the retaining bracket 42 is further defined as a first fixing arm 106 and a second fixing arm 108, as best shown in FIG. 16. When present, the first and second fixing arms 106, 108 are removably coupled to the solenoid connecting member 34. The solenoid connecting member 34 may define a first fixing channel 110 and a second fixing channel 112, as shown in FIGS. 12 and 13, with the first fixing arm 106 being disposed in the first fixing channel 110 and the second fixing arm 108 being disposed in the second fixing channel 112 to couple the retaining bracket 42 to the valve body 54. The first and second fixing channels 110, 112 may be defined by the valve body 54.

When present, the first fixing arm 106 and the body portion 44 may be joined together by a first fixing bend 114, and the second fixing arm 108 and the body portion 44 may be joined together by a second fixing bend 116. The first and second fixing bends 114, 116 provide the spring force from the first and second fixing arms 106, 108 to the solenoid 32 when the retaining bracket 42 is in the secured position. The spring force provided from the first and second fixing arms 106, 108 may be adjusted. For example, the first and second fixing bends 114, 116 may be increased with respect to the body portion 44, i.e., a greater curve, which may increase the spring force, or the first and second fixing bends 114, 116 may be decreased with respect to the body portion 44, i.e., a smaller curve, which may decrease the spring force. Additionally, the first and second fixing bends 114, 116 may be adjusted to also account for a greater tolerance for securing the solenoid 32. Additionally, to adjust the spring force, the thickness of the retaining bracket 42 may be increased to provide a stronger spring force, or may be decreased to provide a smaller spring force. It is to be appreciated that multiple features of the retaining bracket 42, such as the first and second securing bends 86, 88 and the first and second fixing bends 114, 116, may provide the spring force, and that the first and second securing bends 86, 88 and the first and second fixing bends 114, 116 may be adjusted to provide the appropriate spring force.

Figure 14:
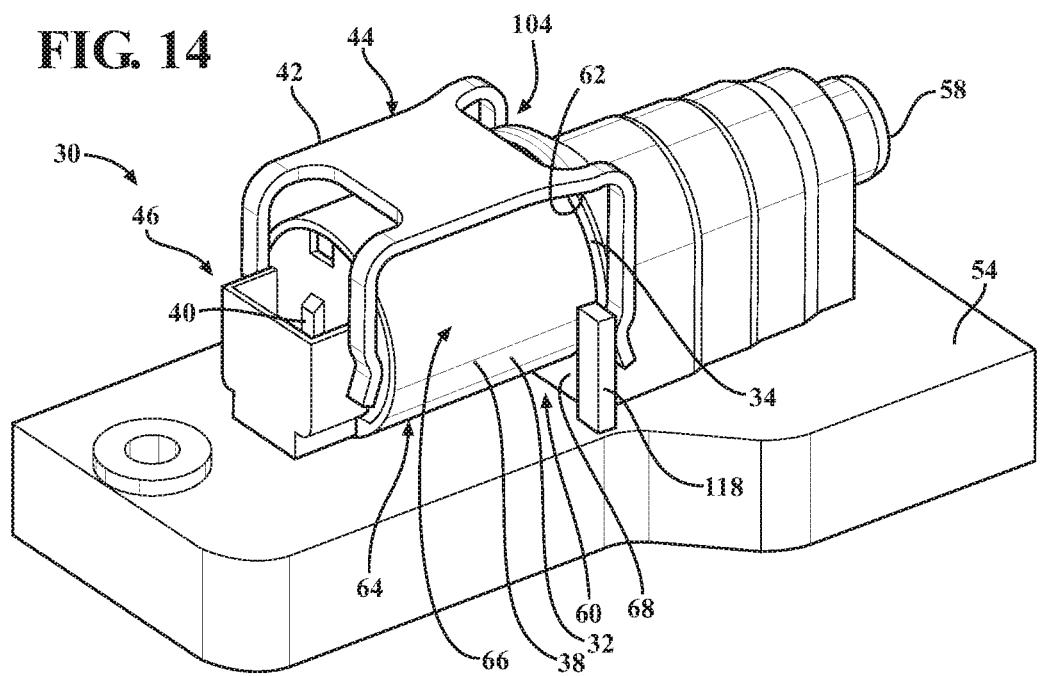
FIG. 14 is a perspective view of the retaining bracket of FIG. 12, with the valve body including a fixed retaining feature adjacent the solenoid connecting member, and with the fixing portion of the retaining bracket engaged with the fixed retaining feature.

In another embodiment, as shown in FIGS. 14 and 15, the valve body 54 may further include a fixed retaining feature 118 adjacent the solenoid connecting member 34, with the fixing portion 104 of the retaining bracket 42 being engageable with the fixed retaining feature 118 when the retaining bracket 42 is in the secured position. The fixed retaining feature 118 may be integral with the valve body 54, i.e., one piece, or the fixed retaining feature 118 may be fastened, welded, cast, machined, or defined with the valve body 54. Alternatively, the fixed retaining feature 118 may be integral with the solenoid connecting member 34, i.e., one piece. It is also to be appreciated that the fixed retaining feature 118 may extend further from the valve body 54 than shown in FIGS. 14 and 15, or the fixed retaining feature 118 may extend less from the valve body 54 than shown in FIGS. 14 and 15.

As best shown in FIG. 16, the first and second fixing arms 106, 108 may have a distal fixing end 120 spaced from the body portion 44, with the first and second fixing arms 106, 108 defining a fixing length FL from the distal fixing end 120 to the body portion 44 of the retaining bracket 42. The fixing length FL of the first and second fixing arms 106, 108 may be adjusted to accommodate different solenoid sizes, to be disposed within the first and second fixing channels 110, 112, and/or to engage the fixed retaining feature 118.

As shown in FIGS. 12-16, when the fixing portion 104 has the first fixing arm 106 and the second fixing arm 108, the securing portion 46 of the retaining bracket 42 may be further defined as the first securing leg 72 and the second securing leg 74, with the first and second securing legs 72, 74 providing the spring force to the solenoid 32 such that the solenoid 32 is biased toward the solenoid connecting member 34 when the retaining bracket 42 is in the secured position. In this embodiment, the first securing leg 72 and the body portion 44 may be joined together by the first securing bend 86, and the second securing leg 74 and the body portion 44 may be joined together by the second securing bend 88. In such cases, the first and second securing bends 86, 88 provide the spring force from the first and second securing legs 72, 74 to the solenoid 32 when the retaining bracket 42 is in the secured position. As described above, the first and second securing bends 86, 88 may be adjusted to achieve the desired spring force. The solenoid 32 is compressed between the first and second securing legs 72, 74 and the first and second fixing arms 106, 108.

During installation, the first and second fixing arms 106, 108 may be disposed within the first and second fixing channels 110, 112, respectively, such that the first and second fixing arms 106, 108 load against the solenoid connecting member 34. Alternatively, the first and second fixing arms 106, 108 may load against the fixed retaining feature 118. As the first and second fixing arms 106, 108 are loaded against the solenoid connecting member 34, the first and second securing legs 72, 74 load against the solenoid 32. Typically, the first and second securing legs 72, 74 load against the top solenoid portion 66. The loading of the first and second fixing arms 106, 108 against the solenoid connecting member 34 and the loading of the first and second securing legs 72, 74 against the solenoid 32 provide the spring force to secure the solenoid 32 to the valve body 54.

As shown in FIGS. 10, 11, and 17-20, the hydraulic control module 48 may include a plurality of the solenoid connecting members 34, and the solenoid assembly 30 may include a plurality of the retaining brackets 42 and a plurality of the solenoids 32. In some embodiments, the plurality of retaining brackets 42 are integral with one another at the body portion 44 of each of the retaining brackets 42. In such embodiments, the retaining bracket 42 may simultaneously mount the plurality of solenoids 32.

As described above, the securing portion 46 and the body portion 44 may straddle the solenoid 32 when the retaining bracket 42 is in the secured position. Having the securing portion 46 and the body portion 44 straddling the solenoid 32 when the retaining bracket 42 is in the secured position allows a closer nesting of multiple solenoids. The plurality of retaining brackets 42 may be integral with one another at the body portion 44 of each of the retaining brackets 42. It is to be appreciated that the plurality retaining brackets 42 may secure the plurality of solenoids 32 to the valve body 54 without the valve body 54 of each of the retaining brackets 42 being integral with one another. In such embodiments, the straddling of the solenoid 32 by the body portion 44 and the securing portion 46 of the retaining bracket 42 allows a closer nesting, i.e., the solenoids may be disposed closer to one another, as there is no requirement to have additional mounting features between each solenoid 32.

As shown in FIGS. 10 and 11, the plurality of retaining brackets 42 may require fewer of the fasteners 92 than when using the retaining bracket 42 as a single retaining bracket. Alternatively, as shown in the embodiment of FIGS. 17-20, no fasteners are required to mount the plurality of solenoids 32.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A hydraulic control module for use with a transmission of a motor vehicle, with the transmission including a transmission housing, said hydraulic control module comprising:
  a valve body adapted to be coupled to the transmission housing and defining a hydraulic circuit;
  a solenoid connecting member; and
  a solenoid assembly comprising,
    a solenoid coupled to said solenoid connecting member, and
    a retaining bracket having a body portion and a securing portion extending from said body portion, with said body portion being removably coupled to said valve body, with said securing portion being removably coupled to said solenoid, and with said retaining bracket being moveable between an unsecured position where said retaining bracket is uncoupled from said solenoid connecting member and said solenoid, and a secured position where said body portion of said retaining bracket is coupled to said solenoid connecting member and said securing portion of said retaining bracket is coupled to said solenoid such that said solenoid is secured to said valve body; wherein
  said securing portion of said retaining bracket provides a spring force to said solenoid when said retaining bracket is in said secured position such that said solenoid is biased toward said solenoid connecting member to secure said solenoid between said solenoid connecting member of said valve body and said securing portion of said retaining bracket.

2. The hydraulic control module as set forth in claim 1, wherein said securing portion of said retaining bracket has a free end that is unattached from said valve body when in either of said secured and unsecured positions, and wherein said body portion of said retaining bracket is fixed to said valve body when said retaining bracket is in said secured position.

3. The hydraulic control module as set forth in claim 1, wherein said securing portion of said retaining bracket is further defined as a first securing leg and a second securing leg, with said first and second securing legs providing said spring force to said solenoid such that said solenoid is biased toward said solenoid connecting member when said retaining bracket is in said secured position.

4. The hydraulic control module as set forth in claim 3, wherein said first and second securing legs each have a curved portion, with each of said curved portions presenting a contact surface to contact and provide said spring force to said solenoid such that said solenoid is biased toward said solenoid connecting member when said retaining bracket is in said secured position.

5. The hydraulic control module as set forth in claim 4, wherein said first securing leg and said body portion are joined together by a first securing bend, and said second securing leg and said body portion are joined together by a second securing bend, with said first and second securing bends providing said spring force from said first and second securing legs to said solenoid when said retaining bracket is in said secured position.

6. The hydraulic control module as set forth in claim 3, wherein said first and second securing legs are angled toward said solenoid with respect to said body portion when said retaining bracket is in said secured position.

7. The hydraulic control module as set forth in claim 1, wherein said solenoid connecting member is integral with said valve body.

8. The hydraulic control module as set forth in claim 1, further comprising a valve coupled to said valve body to control hydraulic fluid within said hydraulic circuit.

9. The hydraulic control module as set forth in claim 8, wherein said solenoid is further defined as a hydraulic solenoid valve, with said hydraulic solenoid valve comprising said valve and a solenoid portion.

10. The hydraulic control module as set forth in claim 9, wherein said solenoid portion has a top solenoid portion and a bottom solenoid portion, and wherein said securing portion of said retaining bracket is coupled to the top solenoid portion when said retaining bracket is in said secured position.

11. The hydraulic control module as set forth in claim 8, wherein said solenoid connecting member defines a bore, with said valve of said hydraulic solenoid valve being received within said bore of said solenoid connecting member, and with said solenoid portion of said hydraulic solenoid valve being coupled to said securing portion of said retaining bracket when said retaining bracket is in said secured position.

12. The hydraulic control module as set forth in claim 1, further comprising a plurality of said solenoid connecting members, and wherein said solenoid assembly further comprises a plurality of said retaining brackets and a plurality of said solenoids, with said plurality of retaining brackets being integral with one another at said body portion of each of said retaining brackets.

13. The hydraulic control module as set forth in claim 1, wherein said valve body further includes a secured retaining feature adjacent said solenoid, with said retaining bracket being engageable with said secured retaining feature such that said secured retaining feature acts as a fulcrum for said retaining bracket when said retaining bracket is in said secured position.

14. The hydraulic control module as set forth in claim 13, wherein said secured retaining feature is integral with said valve body.

15. The hydraulic control module as set forth in claim 1, wherein said solenoid assembly further comprises a fastener for securing said retaining bracket to said valve body.

16. A solenoid assembly comprising:
a solenoid adapted to be coupled to a solenoid connecting member and a support member, and
a retaining bracket having a body portion and a securing portion extending from said body portion, with said body portion being adapted to be removably coupled to the support member, with said securing portion being removably coupled to said solenoid, and with said retaining bracket being moveable between an unsecured position where said retaining bracket is uncoupled from the support member and said solenoid, and a secured position where said body portion of said retaining bracket is coupled to the support member and said securing portion of said retaining bracket is coupled to said solenoid such that said solenoid is secured to the support member, wherein
said securing portion of said retaining bracket provides a spring force to said solenoid when said retaining bracket is in said secured position such that said solenoid is biased toward the solenoid connecting member to secure said solenoid between the solenoid connecting member and said securing portion of said retaining bracket.

17. The solenoid assembly as set forth in claim 16, wherein said securing portion of said retaining bracket has a free end that is adapted to be unattached from the support member when in either of said secured or unsecured positions, and wherein said body portion of said retaining bracket is adapted to be fixed to the support member when said retaining bracket is in said secured position.

18. The solenoid assembly as set forth in claim 16, wherein said securing portion of said retaining bracket is further defined as a first securing leg and a second securing leg, with said first and second securing legs providing said spring force to said solenoid such that said solenoid is biased toward the solenoid connecting member when said retaining bracket is in said secured position.

19. The solenoid assembly as set forth in claim 18, wherein said first and second securing legs each have a curved portion, with each of said curved portions presenting a contact surface to contact and provide said spring force to said solenoid such that said solenoid is biased toward the solenoid connecting member when said retaining bracket is in said secured position.

20. The solenoid assembly as set forth in claim 18, wherein said first securing leg and said body portion are joined together by a first securing bend, and said second securing leg and said body portion are joined together by a second securing bend, with said first and second securing bends providing said spring force from said first and second securing legs to said solenoid when said retaining bracket is in said secured position.

* * * * *